Sept. 27, 1932.  M. O. SNEDIKER  1,879,771
MIXING VALVE
Filed Jan. 4, 1932   2 Sheets-Sheet 1

Witness:
A. B. Davison

Inventor:
Morton O. Snediker
By Thorsey & Thorsey
Attys

Sept. 27, 1932.  M. O. SNEDIKER  1,879,771
MIXING VALVE
Filed Jan. 4, 1932   2 Sheets-Sheet 2
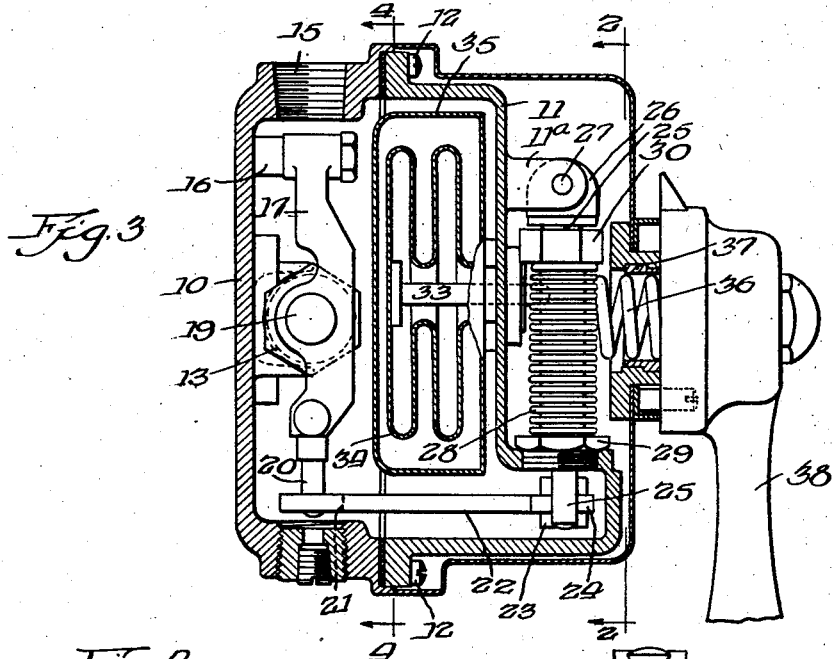
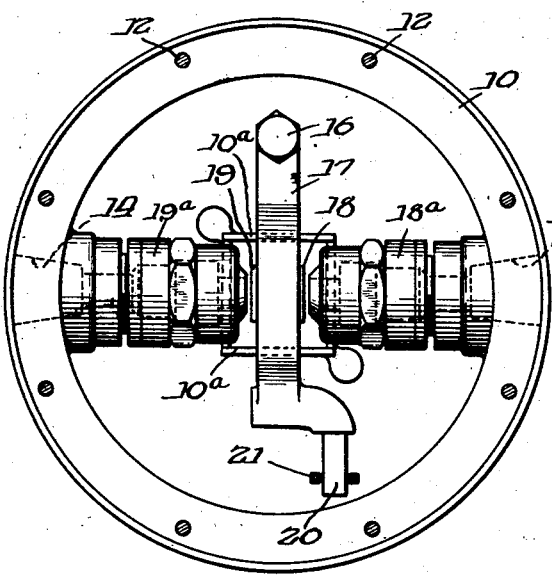
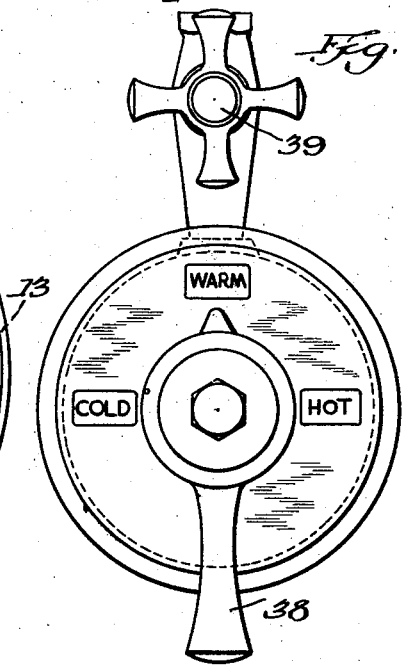
Witness:
R. B. Davison.
Inventor:
Morton O. Snediker.
By Munn & Munn
Attys Patented Sept. 27, 1932

1,879,771

UNITED STATES PATENT OFFICE

MORTON O. SNEDIKER, OF CHICAGO, ILLINOIS, ASSIGNOR TO THE POWERS REGULATOR COMPANY, OF CHICAGO, ILLINOIS, A CORPORATION OF ILLINOIS

MIXING VALVE

Application filed January 4, 1932. Serial No. 584,665.

My invention relates to thermostatically controlled mixing valves and particularly to a practical and completely refined structure having novel features that will be hereafter pointed out.

An object of the construction is to provide a thermostatic mixing valve of the "concealed" type, primarily intended for a shower control, in which the regulation is accurate and the thermostatic motor so arranged that the device is extremely sensitive to variations in the temperature of the delivered water. The construction avoids the difficulties encountered in the pressure-controlled type of mixers, and yet the control is unaffected by the variations in the pressure of either or both of the hot or cold fluids.

The device disclosed is of rugged construction, so arranged as to be practically without possibility of disarrangement or inefficient operation due to wear of parts or interference therewith by the deposit of scale or mineral solids in the water.

The construction is such, however, that the control mechanism may be removed bodily without interfering with the piping connections. When so removed the valve that controls the respective untempered water ports is fully exposed and may be easily removed for the installation of new valve seats if necessary.

The invention will be more readily understood by reference to the accompanying drawings, in which:

Fig. 3 is a vertical sectional view taken at right angles to that of Fig. 1;

Fig. 4 is a sectional view on the line 4—4 of Fig. 3, and

Fig. 5 is a front elevation of the device showing a manual shut off valve applied thereto.

Figure 1:
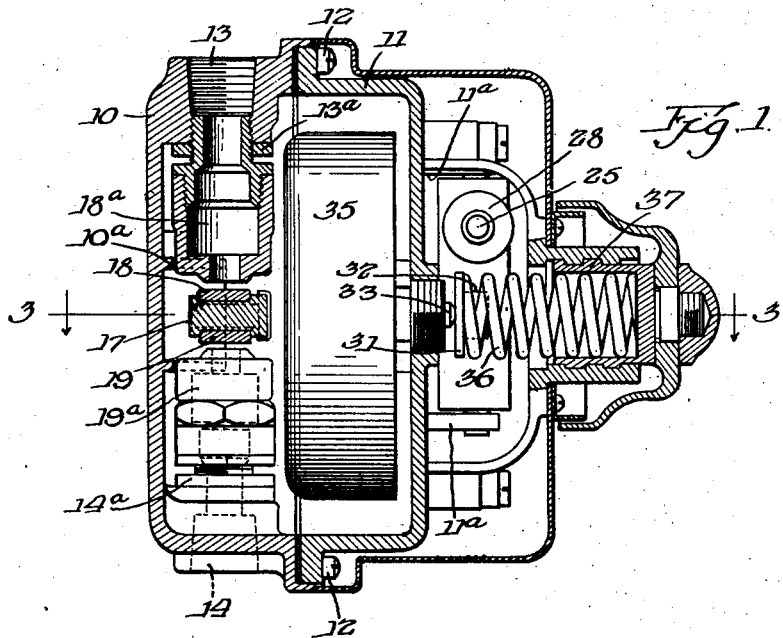
Fig. 1 is a horizontal sectional view through a shower mixer constructed in accordance with my invention.

In the drawings, I have illustrated the device as contained within a casing composed of rear and front sections 10, 11 joined by suitable screws 12. The rear section 10 contains inlet ports 13, 14 and the outlet port 15 for mixed fluids. This rear casing may be permanently connected to the piping and need not be disturbed thereafter for any necessary repairs or replacements in the device. The rear casing carries a boss 16 on which is mounted an oscillating arm 17 that carries, midway of its length a pair of valve seats 18, 19 that control the inlets for cold and hot fluids.

The inlets terminate in nozzles 18a, 19a having threaded shanks that engage in the threaded openings 13, 14 and are held in place by lock nuts 13a, 14a. As a result of this arrangement the position or lateral separation of the inlets can be changed to regulate the degree of opening for the respective hot and cold fluids. Thus there is no required adjustment of the position or thickness of the arm 17 and seats 18, 19.

As a means for insuring the contact of the discharged water directly against a face of the thermostatic motor, I provide the deflector flanges 10a, best shown in Figs. 1, 3 and 4. These flanges are arranged in the form of a half cylinder partially surrounding the ends of the nozzles with the result that the water is discharged laterally against the face of the motor casing 35.

Figure 2:
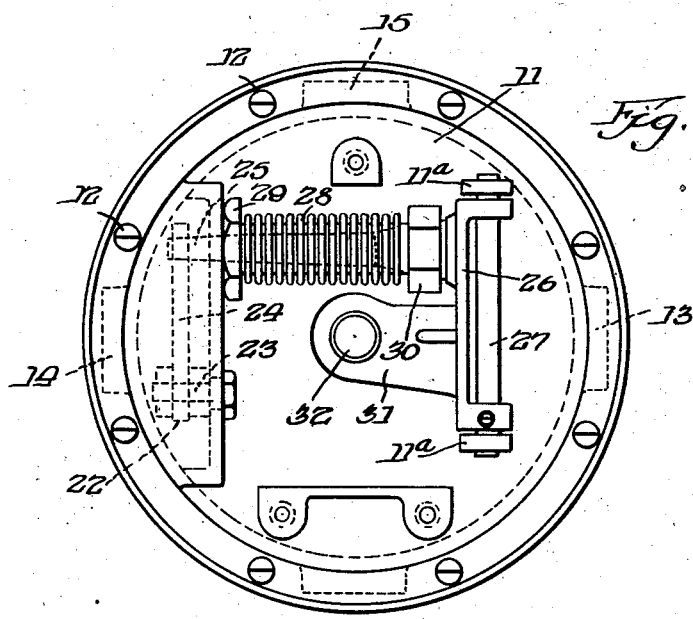
Fig. 2 is a sectional view on the line 2—2 of Fig. 3.

The arm 17 terminates in a finger 20 engaged by the forked end 21 of one arm 22 of a bell crank pivoted on a pin 23 (Fig. 2). The other arm 24 of the bell crank projects substantially at right angles to the arm 22 and is engaged by an arm 25, best shown in Figs. 2 and 3. The arm 25 is rigid with a rocker 26 fulcrumed on a shaft 27 that is carried on ears 11a—11a formed on the front wall of the forward casing section 11. The arm 25 projects through a bellows 28, one end of which is connected by a nut 29 to the casing wall while the other end is connected by a nut 30 to the base of the arm adjacent to the rocker. Thus the motion is transmitted from the inside to the outside of the casing without the use of packing or stuffing boxes.

The rocker 26 has a lateral arm 31 containing a seat 32 for engagement by a motor pin 33, the inner end of which is fixed to the front wall of the thermostatic bellows 34. The thermostatic liquid is contained within the rigid casing 35 which is located immediately alongside of the hot and cold fluid inlets and along which casing the liquids must travel on their way to the outlet.

The arm 31 is pressed outwardly by a coil spring 36, the tension of which is controlled by a screw 37 controlled by an operating handle 38.

For shower installations I prefer to install a manual shut-off valve 39, as shown in Fig. 5.

The operation is as follows: Assuming the presence of suitable connections and the adjustment of the parts as shown in the drawings, the user will first open the shut-off valve 39. Water entering the casing will be tested by the thermostatic motor. If too warm the thermostatic fluid will exert pressure tending to collapse the bellows 34. This will cause an outward thrust of the pin 33 which will act on the arm 31 and cause oscillation of the rocker 26. Thus the arm 25 will be oscillated and consequently the bell crank having the arms 22, 24. The arm 22 will therefore act on the arm 17 and position the valves 18, 19 in order to temper the water according to the setting of the thermostat.

The device is of extreme simplicity and so arranged that in case of necessity, upon removal of the screws 12, the entire operating mechanism with the exception of the arm 17 may, be removed bodily from its position thus exposing the inner section, just as shown in Fig. 4, thus facilitating the removal and replacement of the valve seats if necessary.

It will be noted, as an important feature of the design, that the thermostatic motor is arranged closely adjacent to the water passages, and in the same horizontal plane with the inlet pipes. Therefore, as the action of the vapor-expansion motor is by direct thrust this straight motion must be translated into suitable rocking motion in order to position the inlet control valve between the two inlet openings. Furthermore, the motion of the thermostat takes place outside of the water chamber, whereas the control must be effected within the chamber. By using a system of rockers or oscillating arms I am able to transmit the motion from the outside to the inside of the casing through a bellows. By using a relatively long bellows and so arranging it that it is subjected merely to a slight rocking action instead of a straight expansion and contraction in the line of its axis, such a bellows will last indefinitely; in other words, it will not become crystallized and its life will be infinite for all practical purposes. Thus I have been able to locate the thermostatic motor closely adjacent to the water passages in order to secure efficient operation and have translated the straight thrust of the motor into oscillating motion at the regulating valve all without use of any packing that would require renewal at intervals. The device so constructed is compact, efficient and not subject to the difficulties encountered in many of the mixing valves heretofore suggested.

The provision of adjustable nozzles for varying the size of the discharge opening serves to simplify the problem of valve control as it renders unimportant the thickness of the valve seats carried by the oscillating arm. If following a period of use the seats become thin thus allowing too large an opening, the nozzles may be set up to a corresponding degree. Also the deflector flanges formed as a part of the casing insure an instantaneous transfer of thermic value from the water to the thermo-sensitive motor. This is very important as it avoids the possibility of uncertain or sluggish action such as occurs where the two fluids are not compelled to mix and come into immediate contact with the thermostatic element.

I claim:

1. In combination, a casing including front and rear parts, said rear part containing hot and cold inlets and a mixed fluid outlet, said inlets having opposed discharge openings, a valve arm mounted to oscillate between said openings, a thermostatic motor, connections for causing the motor to effect oscillation of said valve arm, said motor and connections being contained in said outer casing and adapted to be removed as a unit to expose the valved inlets without disturbing the pipe connections.

2. In combination, a two-part casing, one part being permanently connected to inlet and outlet pipes, the other part containing the temperature control mechanism, said last named part with its mechanism being adapted to be readily separated from the first named part, said mechanism including a thermostatic motor arranged in substantially the horizontal plane of the hot and cold fluid inlets, the motion of the motor being in the form of a straight outward thrust, and lever means for translating said thrust into an oscillating motion between the hot and cold inlets.

3. In combination, a two-part casing, one part being permanently connected to inlet and outlet pipes, the other part containing the temperature control mechanism, said last named part with its mechanism being adapted to be readily separated from the first named part, said mechanism including a thermostatic motor arranged in substantially the horizontal plane of the hot and cold fluid inlets, the motion of the motor being in the form of a straight outward thrust, lever means for translating said thrust into an oscillating motion between the hot and cold inlets, and a bellows through which the motor motion is transmitted from the outside to the inside of the casing.

4. In combination, a casing providing lateral inlets for hot and cold fluids with the inlet openings in opposed, spaced-apart relation, a valve arm adapted to oscillate between said openings, a vapor-expansion motor located within said casing closely adjacent to the water passages, bell crank and lever means for translating the straight thrust of the motor into oscillation of said valve arm.

5. In combination, a casing providing lateral inlets for hot and cold fluids with the inlet openings in opposed spaced-apart relation, a valve arm adapted to oscillate between said openings, a vapor expansion motor located within said casing closely adjacent to the water passages, bell crank and lever means for translating the straight thrust of the motor into oscillation of said valve arm, and a bellows surrounding one of said levers at the point of entry of the lever into the mixing chamber of the casing.

6. In combination, a casing having hot and cold fluid inlets and a mixed fluid outlet, an oscillating valve arm, a thermostatic motor, means including an oscillating arm for transmitting the thrust of the motor to the oscillating valve arm, and a bellows surrounding said oscillating arm at the point of entrance of said arm into the casing.

7. In combination, a casing element containing hot and cold fluid inlets and a mixed fluid outlet, said inlets terminating in nozzles arranged in axial alignment and in opposed relation, a lever mounted for oscillation between the nozzled outlets, valves carried by the lever on opposed faces and adapted to selectively restrict one or the other of said nozzle openings, and a thermostatic motor for positioning said lever.

8. In combination, a casing element containing hot and cold fluid inlets and a mixed fluid outlet, said inlets terminating in nozzles arranged in axial alignment and in opposed relation, a lever mounted for oscillation between the nozzled outlets, valves carried by the lever on opposed faces and adapted to selectively restrict one or the other of said nozzle openings, and a thermostatic motor located immediately adjacent to said nozzle openings for positioning said lever.

9. In combination, a casing providing lateral inlets for hot and cold fluids, nozzles in said inlets, said nozzles being arranged in opposed spaced-apart relation, means for adjusting the lateral separation of said nozzles, a valve arm adapted to oscillate between the nozzle openings and a thermostatic motor within said casing adapted to position said valve arm.

10. In combination, a casing providing lateral inlets for hot and cold fluids, nozzles controlling said inlets, said nozzles being arranged in opposed spaced-apart relation, a valve arm adapted to oscillate between said nozzle openings, means for adjusting the lateral separation of said nozzles, a thermostatic motor within said casing for adjusting the position of said valve arm, said thermostatic motor being located in close proximity to the nozzle discharge openings.

11. In combination, a casing providing lateral inlets for hot and cold fluids with the inlet openings in opposed, spaced-apart relation, a valve arm adapted to oscillate between said openings, a vapor-expansion motor located within said casing closely adjacent to the water passages, bell crank and lever means for translating the straight thrust of the motor into oscillation of said valve arm, and means for deflecting the water discharged into said casing directly against a wall of said motor.

In testimony whereof I have affixed my signature.

MORTON O. SNEDIKER.